C. L. TAYLOR.
MACHINE FOR SAWING METAL.
APPLICATION FILED JUNE 12, 1916.
1,227,695.
Patented May 29, 1917.
2 SHEETS—SHEET 1.
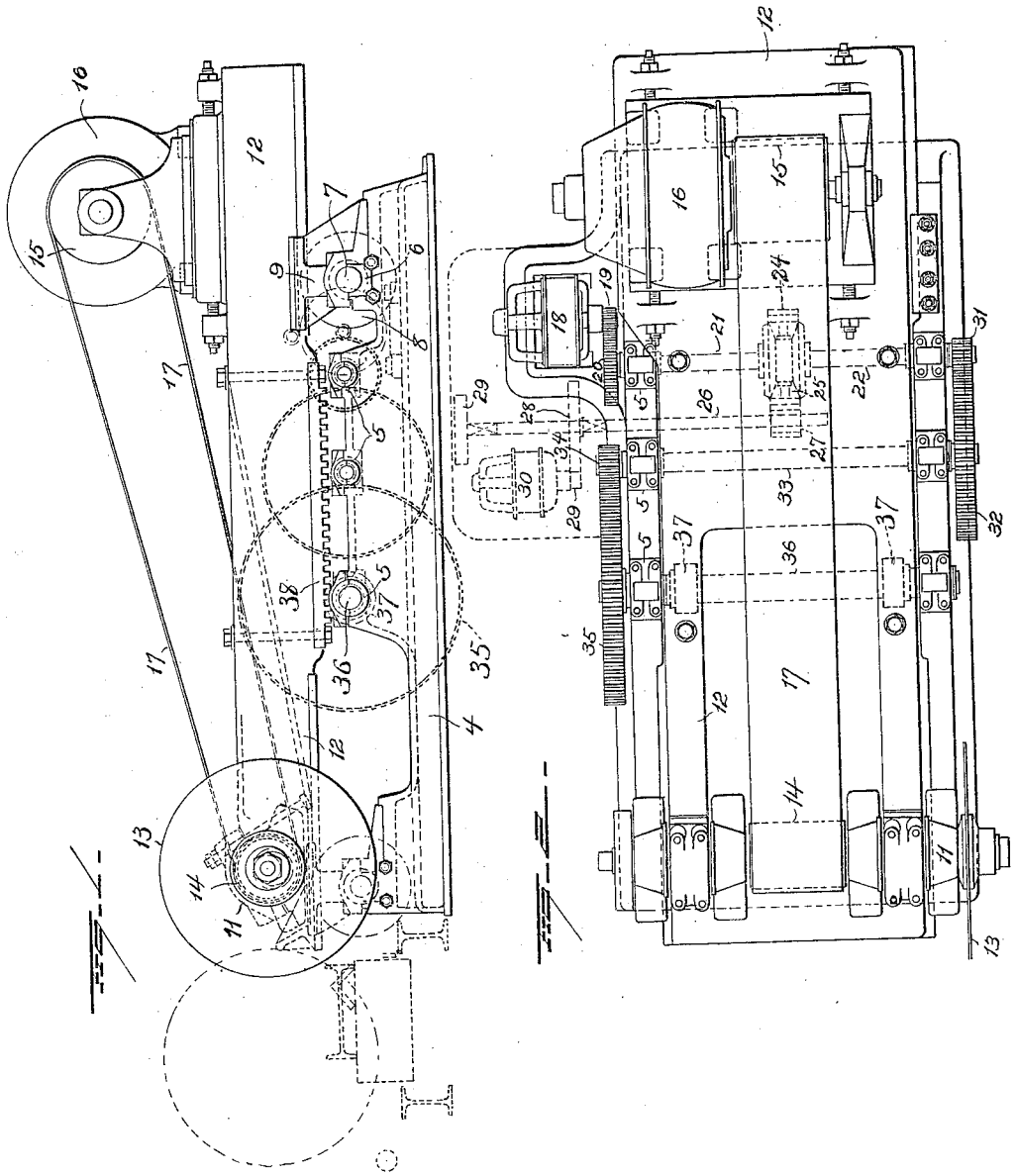
WITNESSES
E. J. Nottingham
G. F. Downing
INVENTOR
C. L. Taylor
By Seymour & Bright
Attorneys C. L. TAYLOR.
MACHINE FOR SAWING METAL.
APPLICATION FILED JUNE 12, 1916.
1,227,695.
Patented May 29, 1917.
2 SHEETS—SHEET 2.
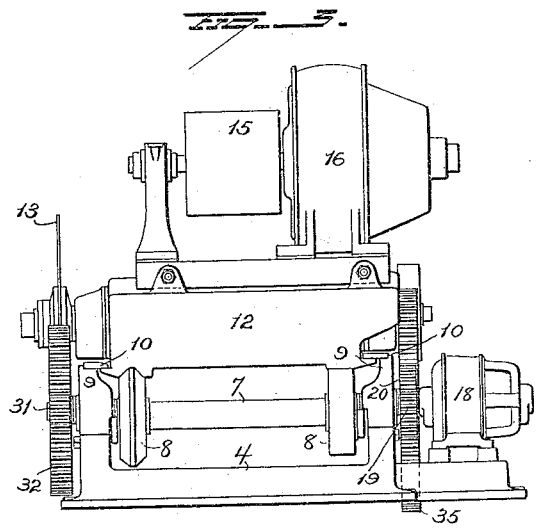
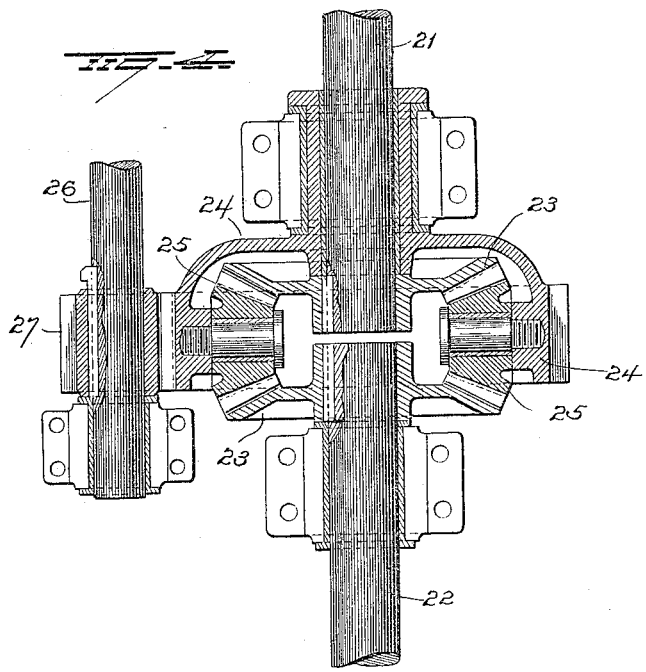
WITNESSES
E. J. Nottingham
G. F. Downing
INVENTOR
C. L. Taylor
By Seymour & Bright
Attorneys

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

MACHINE FOR SAWING METAL.

1,227,695.

Specification of Letters Patent.

Patented May 29, 1917.

Application filed June 12, 1916. Serial No. 103,177.

*To all whom it may concern:*

Be it known that I, CLARENCE L. TAYLOR, a citizen of the United States, and a resident of Alliance, in the county of Stark and State of Ohio, have invented certain new and useful Improvements in Machines for Sawing Metal; and I do hereby declare the following to be a full, clear, and exact description of the invention, such as will enable others skilled in the art to which it appertains to make and use the same.

This invention relates to an improvement in a machine for sawing metal, the object being to provide a machine whereby the speed of feed of the saw can be accurately regulated and controlled, and it consists broadly in a base or support, a table mounted to travel thereon and carrying a rotary saw and motor and means for rotating same, and differential driving means carried by the base and geared to the table for reciprocating the latter.

In the accompanying drawings, Figure 1 is a view in side elevation of my improvement; Fig. 2 is a view in plan; Fig. 3 an end view of the same and Fig. 4 is a view of the differential driving gearing.

4 represents a base, rectangular in shape, and provided with a series of bearings 5 for the several shafts of the driving mechanism, and at its sides adjacent its ends with the bearings 6 for the axles 7 having the table supporting wheels or rollers 8 thereon. One of these wheels or rollers 8 has an inverted V-shape periphery as shown at the left of Fig. 3, and the other plain, and the underside of the table 12 is provided with ways resting on said wheels 8 and shaped to correspond with the peripheries of the same.

Secured to the upper removable sections of the bearings 6 are the brackets 9 having inwardly projecting integral lips 10, which overhang the horizontal flanges at the sides of the table 12, at the ends of the latter, and operate to prevent the table from riding up and off the base.

Mounted in bearings 11 at the front end of table 12 is the shaft carrying the circular saw 13, the latter being secured to the shaft at one side of the table. This shaft is also provided centrally with a pulley 14, which is connected up to pulley 15 on the armature shaft of the motor 16, by the belt 17, the motor 16 being adjustably secured on the table 12, adjacent the rear end of the latter.

Secured to an extension of the base 4 is the main motor 18 for reciprocating the table, the armature shaft of said motor being provided with a pinion 19 meshing with a larger pinion 20 on the shaft 21, the latter being journaled in bearings on the base 4. Located in line with shaft 21, is the shaft 22 also journaled in bearings on the base 4, the adjacent ends of shafts 21 and 22 being connected by differential gearing. This gearing consists of a bevel pinion 23 secured on each shaft 21—22, a ring 24 having a toothed periphery, and a plurality of smaller bevel pinions 25 mounted on bearings projecting inwardly from the ring 24, the said smaller pinions 25 meshing with both pinions 23.

26 is a shaft parallel with shaft 21 and carrying a pinion 27 which meshes with the teeth of ring 24. This shaft passes through the slip gear 28, and is provided at its outer end with a brake 29, which may be either mechanical or electric. The shaft 26 carries the slip gear 28 which meshes with the small pinion 29 on the armature shaft of the motor 30. Secured to the outer end of shaft 22 is the small pinion 31 which meshes with the larger pinion 32 on shaft 33, the latter being provided at its opposite end with a small pinion 34 meshing with larger pinion 35 on shaft 36. These several shafts are mounted in bearings 5 on the base 4, and the shaft 36, carries two pinions 37 which mesh with the rack bars 38 secured to the table adjacent the two sides of the latter, and operate to reciprocate the table longitudinally on the base so as to feed the saw toward and carry it away from the metal to be cut.

Motor 18 is the main table driving motor, and is used for varying speeds within certain limits of feed of the table and saw thereon, without the differential gearing, but by the use of the latter, actuated by an independent motor and a slip gear, I can bring the table to a stop if necessary, and enter the saw very slowly in the article, and at much less speed than would be possible with the main motor and direct acting gearing, and I can also accelerate the speed, so as to move the table more rapidly than possible with the main motor and direct acting gearing, when bringing the saw up to a position to enter the article to be cut and in carrying it rearwardly after the article has been cut.

It is evident that many slight changes might be resorted to in the relative arrangement of parts shown and described without departing from the scope of the claims. Hence I would have it understood that I do not wish to confine myself to the exact construction and arrangement of parts shown and described except as required by the scope of the claims.

Having fully described my invention what I claim as new and desire to secure by Letters-Patent, is:—

1. In a machine for sawing metal, the combination of a base, a table mounted to reciprocate on said base, a motor, a shaft driven by said motor, a second shaft, gearing connecting the last mentioned shaft and table for actuating the latter, differential gearing connecting said two shafts, means for actuating the differential gearing whereby the speed of feed may be varied, a saw shaft and saw journaled in bearings on the table and means for rotating the saw.

2. In a machine for sawing metal, the combination of a base, a table mounted to reciprocate thereon, a motor, a shaft driven by said motor, a second shaft in line with said motor driven shaft, gearing connecting the last mentioned shaft and table for actuating the latter, differential gearing connecting said two shafts, means for actuating the differential gearing, whereby the speed of feed of the table may be varied from the speed transmitted to the driven shaft by the main drive motor, a saw shaft on the table and a motor also carried by the table for rotating the saw shaft.

3. In a machine for sawing metal, the combination of a base, a table mounted to reciprocate thereon, a main motor, a shaft driven by said motor, a second shaft in line with said motor driven shaft, gearing connecting said last mentioned shaft and table for actuating the latter, differential gearing connecting said two shafts, an auxiliary motor driven gear connected with the auxiliary motor for regulating and controlling the differential gear whereby the speed of movement of the table may be varied from the speed transmitted to the driven shaft by the main motor, a saw shaft and motor carried on the table and means connecting said saw shaft and its motor.

4. In a machine for sawing metal, the combination of a base, a table mounted to reciprocate thereon, a main motor, a shaft driven by said motor, a second shaft in line with said motor driven shaft, gearing connecting said last mentioned shaft and table for reciprocating the latter, differential gearing connecting said two shafts, an auxiliary motor, a slip gear, a shaft connected with said auxiliary motor by said slip gear, a brake on said shaft, and a pinion also on said shaft and meshing with a gear on the differential gearing for rotating the latter, a saw shaft on the table and a motor also carried by the table and belted to the saw shaft.

In testimony whereof, I have signed this specification in the presence of two subscribing witnesses.

CLARENCE L. TAYLOR.

Witnesses:
N. C. FETTERS,
MARJORIE McLAUGHLIN.